United States Patent
Otsubo et al.

(10) Patent No.: US 8,930,101 B2
(45) Date of Patent: Jan. 6, 2015

(54) HYBRID VEHICLE DIFFERENTIAL ELEMENT SPEED CONTROL

(75) Inventors: Hideaki Otsubo, Miyoshi (JP); Naoki Ishikawa, Toyota (JP); Hideharu Nohara, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/876,332

(22) PCT Filed: Sep. 27, 2010

(86) PCT No.: PCT/JP2010/066734
§ 371 (c)(1),
(2), (4) Date: Mar. 27, 2013

(87) PCT Pub. No.: WO2012/042590
PCT Pub. Date: Apr. 5, 2012

(65) Prior Publication Data
US 2013/0184920 A1 Jul. 18, 2013

(51) Int. Cl.
*G06F 7/00* (2006.01)
*B60W 20/00* (2006.01)
(Continued)

(52) U.S. Cl.
CPC .............. *B60W 20/30* (2013.01); *B60K 6/365* (2013.01); *B60K 6/445* (2013.01);
(Continued)

(58) Field of Classification Search
CPC ..... B60W 10/06; B60W 10/12; B60W 20/00; B60W 20/30; B60K 6/445; F16H 2037/0873
USPC ................. 701/22, 51, 55; 180/65.265; 477/3
See application file for complete search history.

(56) References Cited

FOREIGN PATENT DOCUMENTS

| JP | 2009 96363 | 5/2009 |
| JP | 2009 154724 | 7/2009 |

(Continued)

OTHER PUBLICATIONS

International Search Report Issued Dec. 28, 2010 in PCT/JP10/66734 Filed Sep. 27, 2010.

(Continued)

*Primary Examiner* — Thomas Tarcza
*Assistant Examiner* — Kevin Myhre
(74) *Attorney, Agent, or Firm* — Oblon, Spivak, McClelland, Maier & Neustadt, L.L.P.

(57) ABSTRACT

A control apparatus for a hybrid vehicle provided with an electrically operated continuously-variable transmitting portion and a step-variable transmitting portion, which control apparatus permits an adequate control of a shifting action of the step-variable transmitting portion, while reducing deterioration of fuel economy of the hybrid vehicle.

The control apparatus is configured to implement concurrent controls of a movement of an operating point of an engine and a shifting action of the step-variable transmitting portion, such that ratios of change rates of rotating speeds of first, second and third rotary elements of a differential mechanism are respectively equal to ratios of differences between present actual values of the rotating speeds of the first, second and third rotary elements and target values of the rotating speeds of the first, second and third rotary elements to be established after the shifting action, so that a shifting shock of the step-variable transmitting portion can be reduced while controlling an electric power generation/consumption balance to a desired value.

5 Claims, 7 Drawing Sheets

(51) Int. Cl.

| | | |
|---|---|---|
| *B60K 6/365* | (2007.10) | |
| *B60K 6/445* | (2007.10) | |
| *B60K 6/543* | (2007.10) | |
| *B60W 10/06* | (2006.01) | |
| *B60W 10/08* | (2006.01) | |
| *B60W 10/101* | (2012.01) | |
| *B60W 10/115* | (2012.01) | |
| *B60W 30/19* | (2012.01) | |
| *B60W 10/11* | (2012.01) | |
| *B60K 6/387* | (2007.10) | |
| *B60W 10/105* | (2012.01) | |
| *B60K 6/38* | (2007.10) | |

(52) U.S. Cl.
CPC ................ *B60K 6/543* (2013.01); *B60W 10/06* (2013.01); *B60W 10/08* (2013.01); *B60W 10/101* (2013.01); *B60W 10/115* (2013.01); *B60W 20/00* (2013.01); *B60W 30/19* (2013.01); *B60W 10/11* (2013.01); *B60K 6/387* (2013.01); *B60W 10/105* (2013.01); *Y02T 10/6239* (2013.01); *Y02T 10/6286* (2013.01); *B60W 2600/00* (2013.01); *Y10S 903/93* (2013.01); *B60K 2006/381* (2013.01)

USPC ................................ 701/55; 701/51; 903/930

(56) References Cited

FOREIGN PATENT DOCUMENTS

| | | |
|---|---|---|
| JP | 2009 166643 | 7/2009 |
| WO | 2012 042591 | 4/2012 |

OTHER PUBLICATIONS

U.S. Appl. No. 13/876,363, filed Mar. 27, 2013, Otsubo et al.

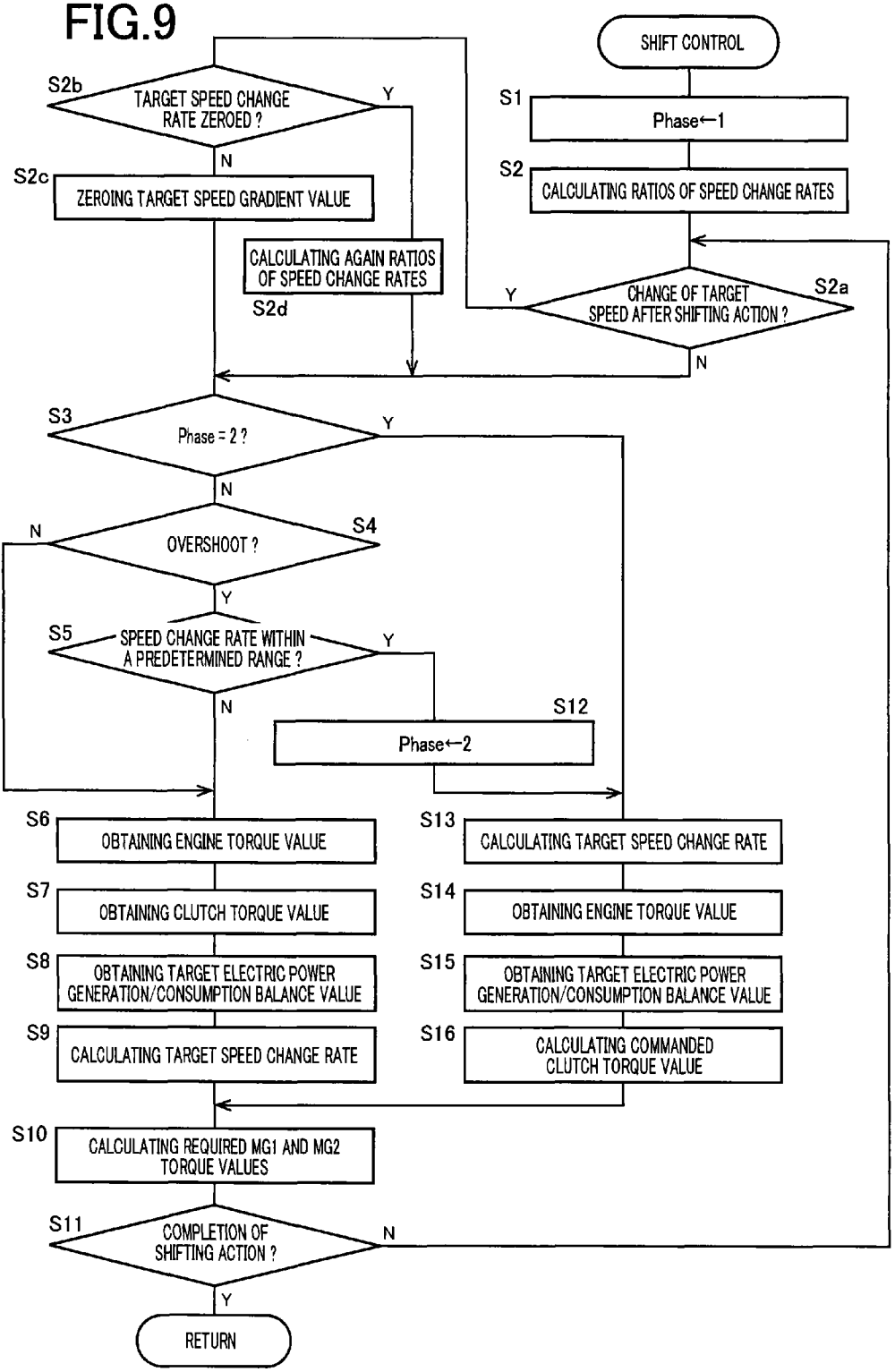

HYBRID VEHICLE DIFFERENTIAL ELEMENT SPEED CONTROL

TECHNICAL FIELD

The present invention relates to a control device for a hybrid vehicle provided with an electrically operated continuously-variable transmitting portion and a step-variable transmitting portion, and more particularly to improvements of the control device for reducing deterioration of fuel economy during shifting actions of the transmitting portions.

BACKGROUND ART

There is known a hybrid vehicle provided with an electrically operated continuously-variable transmitting portion, and a step-variable transmitting portion constituting a part of a power transmitting path between the electrically operated continuously-variable transmitting portion and drive wheels. One example of such a hybrid vehicle is provided with: an electrically operated continuously-variable transmitting portion having a differential mechanism, a first electric motor and a second electric motor; and a step-variable transmitting portion constituting a part of a power transmitting path between the electrically operated continuously-variable transmitting portion and drive wheels. The differential mechanism is provided with a first rotary element, a second rotary element serving as an input rotary member connected to an engine, and a third rotary element serving as an output rotary member. The first electric motor is connected to the first rotary element, while the second electric motor is operatively connected to a power transmitting path between the above-indicated third rotary element and the drive wheels. There is also proposed a technique which permits an adequate shifting control of such a hybrid vehicle. Patent Document 1 discloses an example of a control apparatus for a vehicular power transmitting system. According to this technique, where an output of the second electric motor is limited by a torque control thereof during a change of an input shaft speed of the step-variable transmitting portion (automatic transmitting portion), the second electric motor is controlled to operate as an electric generator by the engine, for canceling the output limitation of the second electric motor, to thereby reduce a shifting shock and a delay of the shifting action.

PRIOR ART DOCUMENTS

Patent Documents

Patent Document 1: JP-A-2009-166643
Patent Document 2: JP-A-2009-154724
Patent Document 3: JP-A-2009-096363

SUMMARY OF THE INVENTION

Object Achieved by the Invention

However, the above-described prior art technique is to generate electricity by increasing a torque of the engine according to limitation of discharging of electric power from an electric-energy storage device, so that an operating point of the engine changes in an uncontrolled manner, In a running state of the vehicle requiring a comparatively high torque of the engine, on the other hand, there is a high need for controlling the operating point of the engine from the standpoint of fuel economy, for instance, so that the operating point of the engine should not change in an uncontrolled manner. Further, a shifting control of the step-variable transmitting portion in an unstable running state with a comparatively high drive power, such as a shifting control of the step-variable transmitting portion in a running state with a comparatively high torque and a movement of the operating point of the engine by moving the engine speed suffers from a drawback of a failure to coordinate the vehicle drive power by electricity generation according to the above-described prior art technique. Thus, the prior art technique is limited in the degree of improvement of the fuel economy during the shifting action of the step-variable transmitting portion. In this respect, there has been a need for developing a control apparatus for a hybrid vehicle provided with an electrically operated continuously-variable transmitting portion and a step-variable transmitting portion, which control apparatus permits an adequate control of a shifting action of the step-variable transmitting portion, while reducing deterioration of fuel economy of the hybrid vehicle.

The present invention was made in view of the background art described above. It is therefore an object of the present invention to provide a control apparatus for a hybrid vehicle provided with an electrically operated continuously-variable transmitting portion and a step-variable transmitting portion, which control apparatus permits an adequate control of a shifting action of the step-variable transmitting portion, while reducing deterioration of fuel economy of the hybrid vehicle.

Means For Achieving The Object

The object indicated above is achieved according to the present invention, which provides a control apparatus for a hybrid vehicle provided with: a differential mechanism provided with a first rotary element, a second rotary element functioning as an input rotary element and connected to an engine, and a third rotary element functioning as an output rotary element; a first electric motor connected to the first rotary element; an electrically operated continuously-variable transmitting portion having a second electric motor operatively connected to a power transmitting path from the above-described third rotary element to drive wheels; and a step-variable transmitting portion constituting a part of a power transmitting path from the third rotary element to the drive wheels, the control apparatus being characterized by implementing concurrent controls of a movement of an operating point of the above-described engine and a shifting action of the above-described step-variable transmitting portion, such that ratios of change rates of rotating speeds of the above-described first, second and third rotary elements are respectively equal to ratios of differences between present actual values of the rotating speeds of the first, second and third rotary elements and target values of the rotating speeds of the first, second and third rotary elements to be established after the shifting action.

Advantages of the Invention

The control apparatus according to the present invention described above is configured to implement the concurrent controls of the movement of the operating point of the above-described engine and the shifting action of the above-described step-variable transmitting portion, such that the ratios of the speed change rates of the rotating speeds of the above-described first, second and third rotary elements are respectively equal to the ratios of the differences between the present actual rotating speeds of the first, second and third rotary elements and target values of the rotating speeds of the first, second and third rotary elements to be established after the shifting action, so that the shifting shock of the step-variable transmitting portion can be reduced while controlling an electric power generation/consumption balance to the desired value. Namely, the present control apparatus for the hybrid vehicle permits an adequate control of the shifting action while reducing deterioration of the fuel economy of the hybrid vehicle.

In one preferred form of the invention, the control apparatus is configured to implement the concurrent controls of the movement of the above-described engine and the shifting action of the above-described step-variable transmitting portion such that in the event of a change of the target value of the rotating speed of at least one of the above-described first, second and third rotary elements to be established after the shifting action, the change rate of the rotating speed of each of the above-described at least one of the first, second and third rotary elements is updated depending upon the changed target value. In this case, the shifting action can be adequately controlled without deviation of an electric power generation/consumption balance value from its target value even in the event of a change of the target rotating speed value due to an operation of an accelerator pedal in the process of the shifting action.

According to another preferred form of the invention, the control apparatus is configured to update the above-described change rate of the rotating speed of each of the at least one of the first, second and third rotary elements at a point of time at which an absolute value of the actual change rate of the rotating speed of said each rotary element has been lowered below a predetermined threshold value. In this case, an abrupt change of the rotating speed of each rotary element can be prevented, so that the shifting action can be more adequately controlled.

According to a further preferred form of the invention, the control apparatus is configured to calculate a target value of the change rate of the rotating speed of each of the above-described first, second and third rotary elements, by effecting balance calculation according to a predetermined relationship, and on the basis of the ratios of the change rates of the rotating speeds of the above-indicated first, second and third rotary elements corresponding to the respective ratios of the above-described differences, an output power of the above-described engine during the shifting action, a power transmitted through a coupling element provided in the above-described step-variable transmitting portion, a target value of an electric power generation/consumption balance value of the above-described first electric motor and the above-described second electric motor, and an inertia working efficiency. In this case, the target value of the change rate of the rotating speed of each rotary element, which permits the shifting action to be adequately controlled without deviation of the electric power generation/consumption balance value from its target value, can be obtained in a practically advantageous manner.

According to a still further preferred form of the invention, the control apparatus is configured to achieve the target value of the change rate of the rotating speed of each of said first, second and third rotary elements, by controlling at least one of a torque of said the above-described engine, a torque of the coupling element provided in the above-described step-variable transmitting portion, a torque of the above-described first electric motor and a torque of the above-described second electric motor. In this case, the shifting action can be controlled in a practically advantageous manner, so as to reduce the shifting shock while controlling the electric power generation/consumption balance to the desired value.

According to a yet further preferred form of the invention, the control apparatus is configured to effect the balance calculation, by calculating the electric power generation/consumption balance value while excluding a work done by operations of the above-described first electric motor and the above-described second electric motor. In this case, the balance calculation of input and output powers can be effected in a practically advantageous manner in a power transmitting system provided with the above-described electrically operated continuously-variable transmitting portion and step-variable transmitting portion.

According to yet another form of the invention, the control apparatus is configured to achieve a target value of the above-described change rate of the rotating speed, while taking account of a work done by operations of the above-described first electric motor and the above-described second electric motor. In this case, the shifting action can be controlled in a practically advantageous manner, so as to reduce the shifting shock while controlling the electric power generation/consumption balance to the desired value.

BRIEF DESCRIPTION OF THE DRAWINGS

FIG. 9 is a flow chart illustrating a major portion of the shifting control by the electronic control device for the hybrid vehicle of FIG. 1.

MODE FOR CARRYING OUT THE INVENTION

Figure 1:
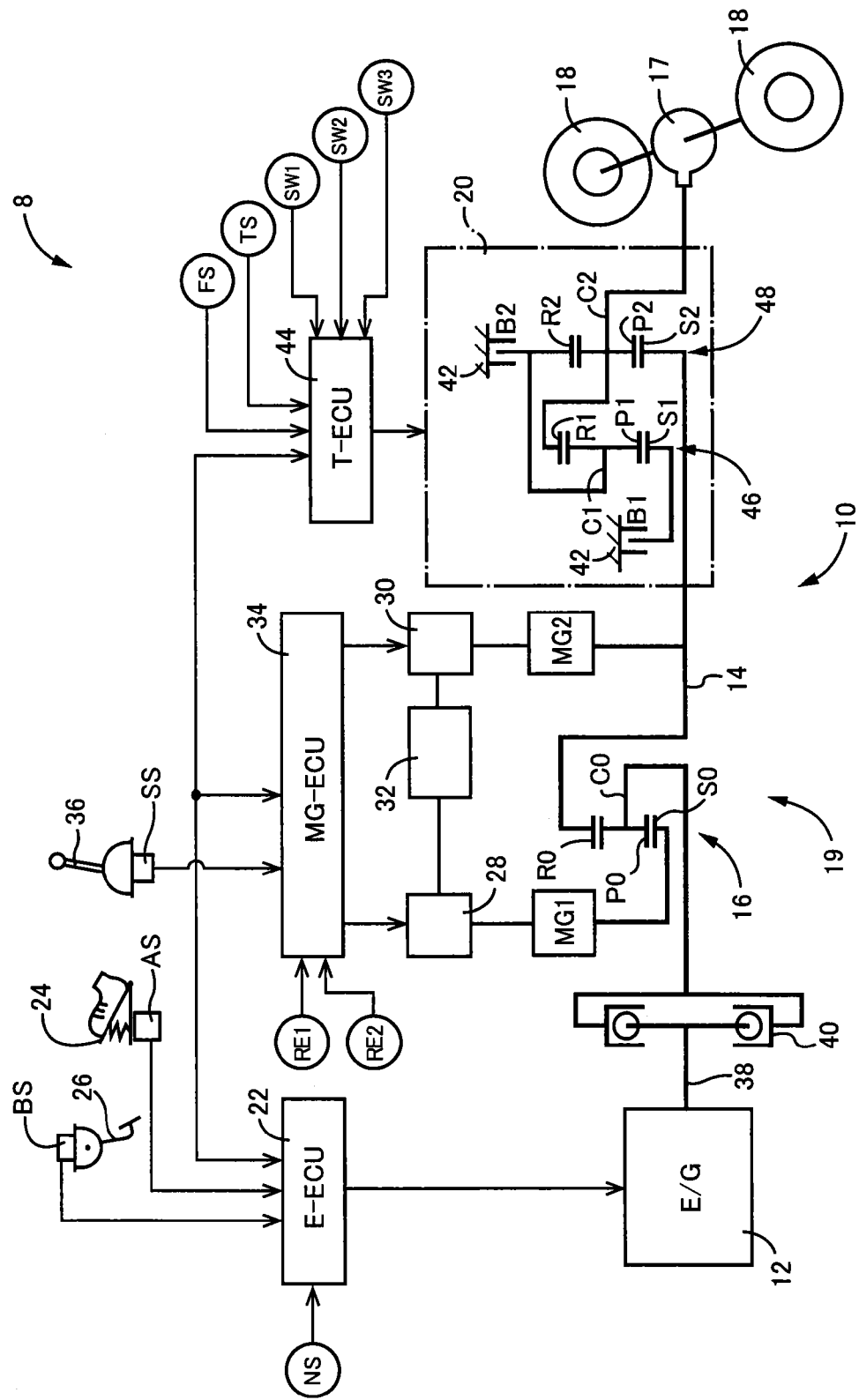
FIG. 1 is a view for explaining a hybrid vehicle to which the present invention is suitably applicable.

Referring to the drawings, a preferred embodiment of this invention will be described in detail.
Embodiment FIG. 1 is the view for explaining a hybrid vehicle 8 to which the present invention is suitably applicable. The hybrid vehicle 8 shown in FIG. 1 is suitably used as an FR (front-engine rear-drive) vehicle, for example, and is provided with a power transmitting system 10 having a power distributing device 16 configured to distribute a drive force generated by a main drive power source in the form of an engine 12, to a first electric motor in the form of a first motor/generator MG1 (hereinafter abbreviated as "MG1") and to a power transmitting member in the form of an output shaft 14. The power transmitting system 10 further has a second electric motor in the form of a second motor/generator MG2 (hereinafter abbreviated as "MG2") connected through a mechanically operated step-variable transmitting portion 20 to a power transmitting path between the power distributing device 16 and drive wheels 18. Torques generated by the above-indicated engine 12 and MG1 are transmitted to the above-indicated output shaft 14, and to the pair of right and left drive wheels 18 through a differential gear device 17.

In the power transmitting system 10 described above, the torque capacity to be transmitted from the above-indicated MG2 to the output shaft 14 is increased and reduced according to a presently selected speed ratio $\gamma_s$ of the step-variable transmitting portion 20 (=rotating speed of the MG2/rotating speed of the output shaft 14). The step-variable transmitting portion 20, which has a plurality of speed ratio values $\gamma_s$ not lower than "1", permits the output torque of the above-indicated MG2 to be boosted so that the boosted torque is transmitted to the output shaft 14, when the MG2 is operated to generate a vehicle drive force. In this respect, the required capacity and size of the MG2 can be further reduced. When the rotating speed of the output shaft 14 is raised in a high speed running of the vehicle, the speed ratio $\gamma_s$ of the above-indicated step-variable transmitting portion 20 is lowered to lower the operating speed of the above-indicated MG2, for thereby permitting the MG2 to be kept in a state of high operating efficiency. When the rotating speed of the output shaft 14 is lowered, on the other hand, the speed ratio $\gamma_s$ of the above-indicated step-variable transmitting portion 20 is increased as needed.

The above-indicated engine 12 is a known internal combustion engine such as a gasoline engine or a diesel engine, which operates to generate a drive force by combustion of a suitable fuel. An angle of opening of a throttle valve or an intake air quantity, an amount of supply of the fuel, an ignition timing and other operating states of the engine 12 are electrically controlled by an engine control electronic control device (hereinafter abbreviated as "E-ECU") 22 which is principally constituted by a so-called microcomputer incorporating a CPU, a RAM, a ROM and an input-output interface, for instance. The above-indicated E-ECU 22 is configured to receive an output signal of an accelerator angle sensor AS indicative of an operation amount of Acc of an accelerator pedal 24, an output signal of a brake sensor BS indicative of an operated state of a brake pedal 26, an output signal of an engine speed sensor NS indicative of an operating speed $N_e$ of the engine 12, etc.

Each of the above-indicated MG1 and MG2 is a synchronous electric motor, for example, which has at least one of a function of an electric motor operable to generate a vehicle drive torque and a function of an electric generator, and which is preferably configured to be operable selectively as the electric motor or the electric generator. The MG1 and MG2 are connected to an electric-energy storage device 32 such as a battery or a capacitor through respective inverters 28 and 30. These inverters 28, 30 are controlled by a motor/generator control electronic control device (hereinafter abbreviated as "MG-ECU" 34) principally constituted by a so-called microcomputer, to adjust or set the output torque or the regenerative torque. The above-indicated MG-ECU 34 is configured to receive an output signal of a shift position sensor SS indicative of a presently selected position of a shift lever 36, an output signal of a MG1 resolver RE1 indicative of the operating speed of the MG1, an output signal of a MG2 resolver RE2 indicative of the operating speed of the MG2, etc.

The above-described power distributing device 16 is constituted by a planetary gear set of a single-pinion type provided with three rotary elements, which consist of: a sun gear S0; a ring gear R0 disposed coaxially with the sun gear S0; and a carrier C0 supporting a pinion gear P0 meshing with the sun gear S0 and the ring gear R0, such that the pinion gear P0 is rotated about its axis and an axis of the planetary gear set. This planetary gear set is disposed coaxially with the above-described engine 12 and step-variable transmitting portion 20. Since each of the above-indicated power distributing device 16 and step-variable transmitting portion 20 is symmetric in construction with respect to its axis, its lower half is not shown in FIG. 1.

In the above-described power transmitting system 10, a crankshaft 38 of the above-described engine 12 is connected through a damper 40 to the carrier C0 of the above-described power distributing device 16, and the above-indicated MG1 is connected to the sun gear S0, while the above-indicated output shaft 14 which is an input shaft of the above-described step-variable transmitting portion 20 is connected to the ring gear R0. In the power distributing device 16, the carrier C0 functions as an input element, and the sun gear S0 functions as a reaction element, while the ring gear R0 functions as an output element.

Figure 2:
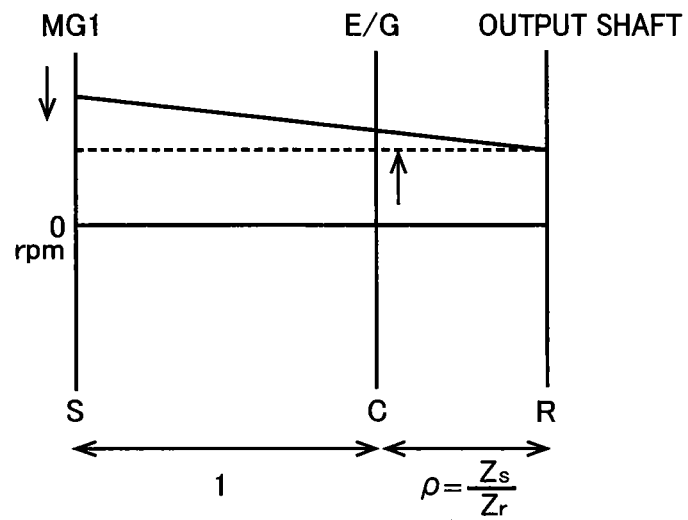
FIG. 2 is a collinear chart indicating relative rotating speeds of rotary elements of a power distributing device provided in the hybrid vehicle of FIG. 1.

The relative rotating speeds of the rotary elements of the above-described power distributing device 16 are indicated in the collinear chart of FIG. 2. In this collinear chart, vertical axes S, C and R respectively indicate the rotating speeds of the sun gear S, carrier C0 and ring gear R0. Distances between adjacent ones of the vertical axes S, C and R are determined such that the distance between the vertical axes C and R is equal to $\rho$ (=number Zs of teeth of the sun gear S0/number Zr of teeth of the ring gear R0) where the distance between the vertical axes S and C is equal to "1". In this power distributing device 16, the MG1 functions as the electric generator when a reaction torque corresponding to the output torque of the above-indicated engine 12 transmitted to the carrier C0 is transmitted to the sun gear S0. The operating speed $N_e$ of the above-indicated engine 12 can be varied continuously (without a stepping change) by raising and lowering the operating speed of the MG1 while the operating speed NO of the ring gear R0 (output shaft speed) is kept constant. A broken line in FIG. 2 indicates a drop of the operating speed $N_e$ of the engine 12 when the operating speed of the MG1 is lowered from a value indicated by a solid line. Namely, the operating speed $N_e$ of the engine 12 can be controlled to a value for maximum fuel economy, by controlling the MG1. This type of hybrid control is called a mechanical distribution type or a split type.

Namely, the above-described power distributing device 16 provided in the above-described power transmitting system 10 is equivalent to a differential mechanism provided with a firs rotary element in the form of the sun gear S0, a second rotary element in the form of the carrier C0 functioning as an input rotary element, and a third rotary element in the form of the ring gear R0 functioning as an output rotary element. The above-indicated first rotary element in the form of the sun gear S0 is connected to the above-described MG1, and the second rotary element in the form of the carrier C0 is connected to the above-described engine 12, while the third rotary element in the form of the ring gear R0 is connected to the above-described MG2, so that the above-indicated power distributing device 16, MG1 and MG2 cooperate to constitute an electrically operated continuously-variable transmitting portion 19.

Referring back to FIG. 1, the above-described step-variable transmitting portion 20 is connected in series to a power transmitting path between the above-indicated electrically operated continuously-variable transmitting portion 19 and the drive wheels 18, and is constituted by two planetary gear sets 46 and 48 rotary elements of which are connected to each other. That is, the step-variable transmitting portion 20 is provided with: a planetary gear set 46 of a single-pinion type configured to perform a known differential function and having three rotary elements consisting of a sun gear S1, a ring gear R1 disposed coaxially with the sun gear S1, and a carrier C1 supporting a pinion gear P1 meshing with the sun gear S1 and ring gear R1, such that the pinion gear P1 is rotatable about its axis and an axis of the planetary gear set 46; and a planetary gear set 48 of a single-pinion type configured to perform a known differential function and having three rotary elements consisting of a sun gear S2, a ring gear R2 disposed coaxially with the sun gear S2, and a carrier C2 supporting a pinion gear P2 meshing with the sun gear S2 and ring gear R2, such that the pinion gear P2 is rotatable about its axis and an axis of the planetary gear set 48. The carrier C1 and the ring gear R2 are connected to each other, while the ring gear R1 and the carrier C2 are connected to each other. Further, the above-indicated sun gear S2 is connected to the input member in the form of the above-indicated output shaft 14, while the above-indicated ring gear R1 and carrier C2 are connected to the output member in the form of the input shaft of the above-indicated differential gear device 17.

The above-indicated step-variable transmitting portion 20 is provided with a plurality of coupling elements for selectively establishing a plurality of speed positions having respective different speed ratio values. That is, a first brake B1 is provided between the sun gear S1 and a housing 42, for selectively fixing the sun gear S1 to the housing 42, while a second brake B2 is provided between the carrier C1 and ring gear R2 connected to each other, and the housing 42, for selectively fixing the carrier C1 and ring gear R2 to the housing 42. Each of these first and second brakes B1 and B2 is a hydraulically operated coupling device of a multiple-disc type or a band type which is configured to generate a frictional engaging force corresponding to a hydraulic pressure of a working fluid supplied from a hydraulic control device not shown. The torque capacity, that is, a clutch torque (engaging torque) $T_{b1}$, $T_{b2}$ of each brake B1, B2 is continuously variable according to an engaging hydraulic pressure generated by an appropriate hydraulic actuator.

In the step-variable transmitting portion 20 constructed as described above, the above-indicated sun gear S2 functions as an input member, and the above-indicated ring gear R1 and carrier C2 connected to each other function as an output member. The step-variable transmitting portion 20 is shifted to its high-speed position H having a speed ratio γsh higher than "1", when the above-indicated first brake B1 is brought to its engaged state, and is shifted to its low-speed position L having a speed ratio γsl higher than the speed ratio γsh of the high-speed position H, when the above-indicated second brake B2 is brought to its engaged state. The step-variable transmitting portion 20 is shifted between those high-speed and low-speed positions H and L, on the basis of a running state of the vehicle as represented by the vehicle running speed and a value relating to a vehicle operator's required vehicle drive force (target vehicle drive force related value). Described more specifically, the step-variable transmitting portion 20 is subjected to a shifting control to establish one of the high-speed and low-speed positions H, L, on the basis of the vehicle running state, and according to a map (shifting boundary lines) which defines the speed positions and which is obtained by experimentation and stored in memory. This shifting control is implemented by a shifting control electronic control device (abbreviated as "T-ECU") 44 constituted principally by a so-called microcomputer. This T-ECU 44 is configured to receive an output signal of an oil temperature sensor TS indicative of a temperature of the working fluid, an output signal of a first hydraulic pressure switch SW1 indicative of the engaging hydraulic pressure of the above-indicated first brake B1, an output signal of a second hydraulic pressure switch SW2 indicative of the engaging hydraulic pressure of the above-indicated second brake B2, an output signal of a third hydraulic pressure switch SW3 indicative of a line pressure PL, etc.

Figure 3:
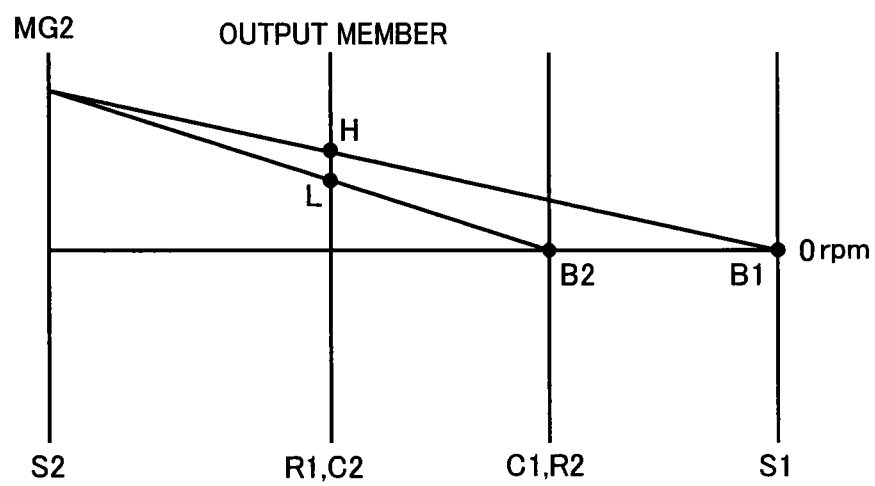
FIG. 3 is a collinear chart indicating relative rotating speeds of rotary elements of a planetary gear set provided in a step-variable transmitting portion provided in the hybrid vehicle of FIG. 1.

FIG. 3 is the collinear chart having four vertical axes consisting of an axis S2, an axis R1,C2, an axis C1, R2 and an axis S1 which indicate relative rotating speeds of the rotary elements of the planetary gear sets 46, 48 of the above-described step-variable transmitting portion 20. The vertical axis S2, vertical axis R1,C2, vertical axis C1, R2 and vertical axis S1 respectively indicate the rotating speed of the above-indicated sun gear S2, the rotating speed of the above-indicated ring gear R1 and carrier C2 connected to each other, the rotating speed of the above-indicated carrier C1 and ring gear R2 connected to each other, and the rotating speed of the above-indicated sun gear S1. As indicated in this collinear chart, the above-described step-variable transmitting portion 20 is placed in its low-speed position L when the above-indicated carrier C1 and ring gear R2 are fixed to the above-indicated housing 42 by the above-indicated second brake B2. In the low-speed position L, an assisting torque generated by the above-described MG2 is boosted according to the presently established speed ratio $\gamma_{sl}$, so that the boosted assisting torque is transmitted to the above-indicated output shaft 14. When the above-indicated sun gear S1 is fixed to the above-indicated housing 42 by the above-indicated first brake B1, on the other hand, the step-variable transmitting portion 20 is placed in its high-speed position H having the speed ratio $\gamma_{sh}$ lower than the speed ratio $\gamma_{sl}$ of the low-speed position L. Since the speed ratio of the high-speed position H is also higher than "1", the assisting torque generated by the above-described MG2 is boosted according to the speed ratio $\gamma_{sh}$, so that the boosted assisting torque is transmitted to the above-indicated output shaft 14. The torque transmitted to the output shaft 14 is kept constant at an output torque value as boosted according to the speed ratio of the selected speed position while the low-speed position L or high-speed position H is steadily established. In the process of a shifting action of the above-described step-variable transmitting portion 20, however, the torque transmitted to the output shaft 14 is influenced by an inertia torque determined by the torque capacity and a change of the rotating speed of the relevant brake B1, B2. It is also noted that the torque transmitted to the above-indicated output shaft 14 is a positive value when the above-described MG2 is placed in its operated state, and a negative value when the MG2 is placed in its non-operated state.

Figure 4:
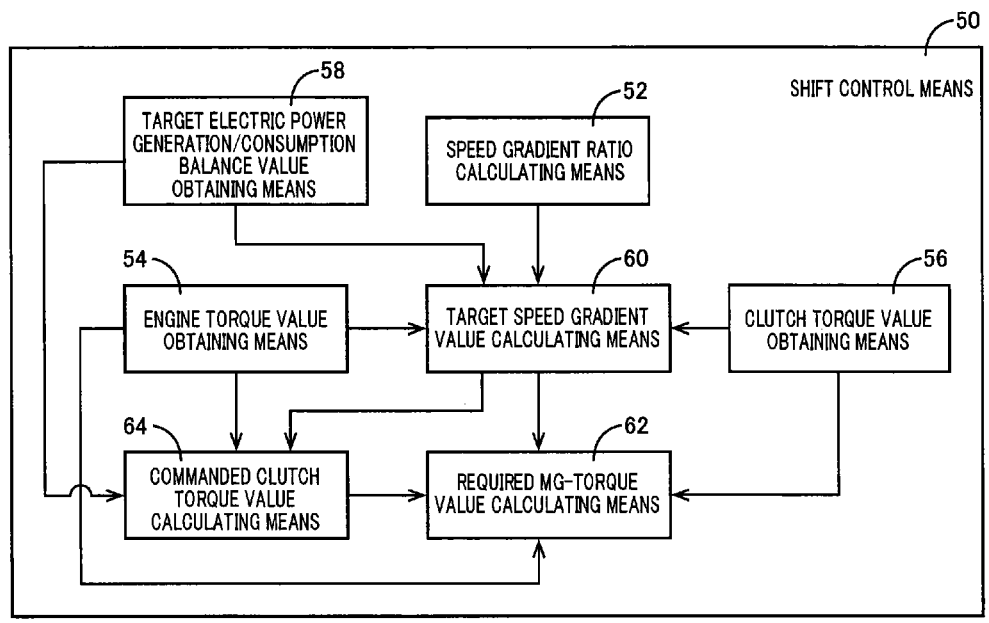
FIG. 4 is a functional block diagram for explaining major control functions of an electronic control device provided for the hybrid vehicle of FIG. 1.

FIG. 4 is the functional block diagram for explaining major control functions of the above-described E-ECU 22, MG-ECU 34 and T-ECU 44. Preferably, each of various control means shown in FIG. 4 is entirely provided in one of the above-indicated E-ECU 22, MG-ECU 34 and T-ECU 44. However, each of these control means may be discretely provided in those control devices. In the power transmitting system 10 according to the present embodiment, the above-indicated E-ECU 22, MG-ECU 34 and T-ECU 44 are mutually separate control devices. However, the above-described hybrid vehicle 8 may use a single control apparatus having the functions of those separate control devices. In this case, each of the various control means shown in FIG. 4 is preferably entirely provided in the single control apparatus.

Shift control means 50 shown in FIG. 4 is configured to control shifting actions of the above-described electrically operated continuously-variable transmitting portion 19 and step-variable transmitting portion 20. Namely, the shift control means 50 is configured to control the above-described MG1 and MG2 on the basis of a running condition of the vehicle such as a running speed V of the vehicle and the accelerator pedal operation amount Acc, for example, and according to a predetermined relationship, to implement a continuously-variable shifting control for continuously changing the speed ratio of the above-indicated electrically operated continuously-variable transmitting portion 19. The shift control means 50 is further configured to implement a step-variable shifting control for selectively placing the step-variable transmitting portion 20 in the high-speed position H or low-speed position L, on the basis of the vehicle running speed V and the accelerator pedal operation amount Acc, for example, and according to a predetermined relationship. The above-indicated shift control means 50 preferably consists of continuously-variable shifting control means for controlling the shifting action of the above-indicated electrically operated continuously-variable transmitting portion 19, and step-variable shifting control means for controlling the shifting action of the step-variable transmitting portion 20. For instance, the continuously-variable shifting control means is provided in the above-indicated MG-ECU 34, while the step-variable shifting control means is provided in the above-indicated T-ECU 44. However, the shift control means 50 according to the present embodiment will be described without distinction between the continuously-variable shifting control means and the step-variable shifting control means.

The above-indicated shift control means 50 implements, as needed, concurrent controls of the shifting actions of the above-described electrically operated continuously-variable transmitting portion 19 and step-variable transmitting portion 20. That is, the shift control means 50 concurrently (continuously) implements the continuously-variable shifting control for continuously changing the speed ratio of the above-indicated electrically operated continuously-variable transmitting portion 19 by controlling the above-indicated MG1 and MG2 on the basis of the vehicle running state and the predetermined relationship, and the step-variable shifting control for selectively placing the step-variable transmitting portion 20 in the high-speed position H or low-speed position L. Further, the shift control means 50 implements concurrent controls of a movement of an operating point of the above-described engine 12 and the shifting action of the above-indicated step-variable transmitting portion 20. For implementing the concurrent controls of the movement of the operating point of the engine 12 and the shifting action of the step-variable transmitting portion 20, the shift control means 50 includes speed gradient ratio calculating means 52, engine torque value obtaining means 54, clutch torque value obtaining means 56, target electric power generation/consumption balance value obtaining means 58, target speed gradient value obtaining means 60, required MG-torque value calculating means 62 and commanded clutch torque value calculating means 64.

Figure 5:
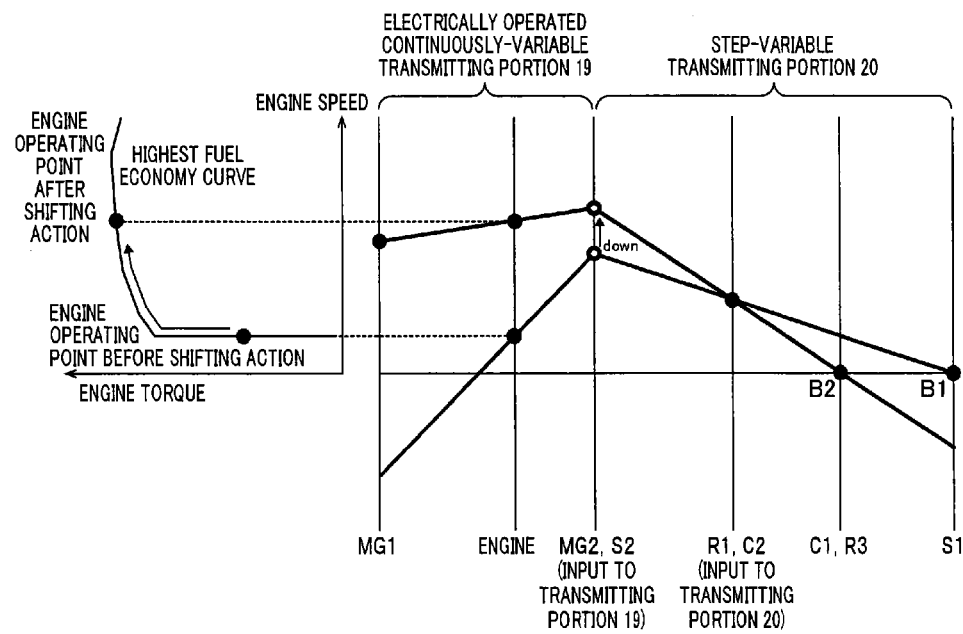
FIG. 5 is a view for explaining concurrent controls of a movement of an operating point of an engine and a shifting action of the step-variable transmitting portion, which concurrent controls are implemented according to an embodiment of this invention.

In the above-described power transmitting system 10, the engine operating point is moved by changing a torque $T_e$ and speed $N_e$ of the engine 12 along a predetermined highest (optimum) fuel economy curve, as indicated in FIG. 5, so that the engine 12 produces a required drive power. In a running state requiring a comparatively high value of the engine torque, there is a high need for controlling the engine operating point from the standpoint of the fuel economy, that is, the engine operating point should not change in an uncontrolled manner. In this running state, the prior art technique does not permit an adequate control of the engine operating point. Further, a shifting control of the step-variable transmitting portion 20 in an unstable running state, such as a shifting control of the step-variable transmitting portion 20 in a running state with a comparatively high torque and a movement of the operating point of the engine by changing the engine speed suffers from a drawback of a failure to coordinate the vehicle drive power according to the prior art technique. Namely, the shifting action of the above-described step-variable transmitting portion 20 is performed while a comparative large drive force is transmitted therethrough, when the movement of the operating point of the above-described engine 12 and the shifting action of the above-described step-variable transmitting portion 20 are concurrently controlled in the running state requiring the comparatively high value of the engine torque $T_e$, so that the required drive forces generated by the above-described MG1 and MG2 are accordingly large, whereby the operating point of the engine 12 (defined by its torque and speed) is moved by changing the engine torque by an accordingly large amount if the required vehicle drive force is provided by electricity generation with an increase of the engine torque according to the prior art technique. In addition, this movement of the engine operating point may take place in an uncontrolled manner depending upon a change of the electric power generation/consumption balance value. Accordingly, the shifting action of the step-variable transmitting portion 20 should be controlled while considering an overall electric power balance taking account of an overall electric energy generation/consumption balance value in an overall transmission mechanism consisting of the above-described electrically operated continuously-variable transmitting portion 19 and step-variable transmitting portion 20. The shift control means 50 according to the present embodiment controls this shifting action of the step-variable transmitting portion 20, by means of the above-indicated speed gradient ratio calculating means 52, engine torque value obtaining means 54, clutch torque value obtaining means 56, target electric power generation/consumption balance value obtaining means 58, target speed gradient value obtaining means 60, required MG-torque value calculating means 62 and commanded clutch torque value calculating means 64.

The above-indicated shift control means 50 is preferably configured to change a control algorithm or a control amount determining algorithm relating to the concurrent controls of the movement of the operating point of the above-described engine 12 and the shifting action of the above-described step-variable transmitting portion 20, according to speed change rates or gradients of the above-indicated first, second and third rotary elements. For example, the shift control means 50 implements the shifting controls according to different control algorithms in respective first and second phases of the speed change rate of each rotary element. Preferably, the shift control means 50 switches the control algorithm for controlling the shifting action, at a point of time at which an absolute value of a rate of change of the actual rotating speed of each of the first, second and third rotary elements, namely, a speed change rate $d\omega/dt$ (time derivative of the speed, namely, rate of change of the speed, which is indicated by a dot in the following figure and mathematical formulas) has been lowered below a predetermined threshold value, more preferably, at a point of time at which the absolute values of the change rates $d\omega/dt$ of the actual rotating speeds of all of the first, second and third rotary elements have been lowered below predetermined threshold values.

Figure 6:
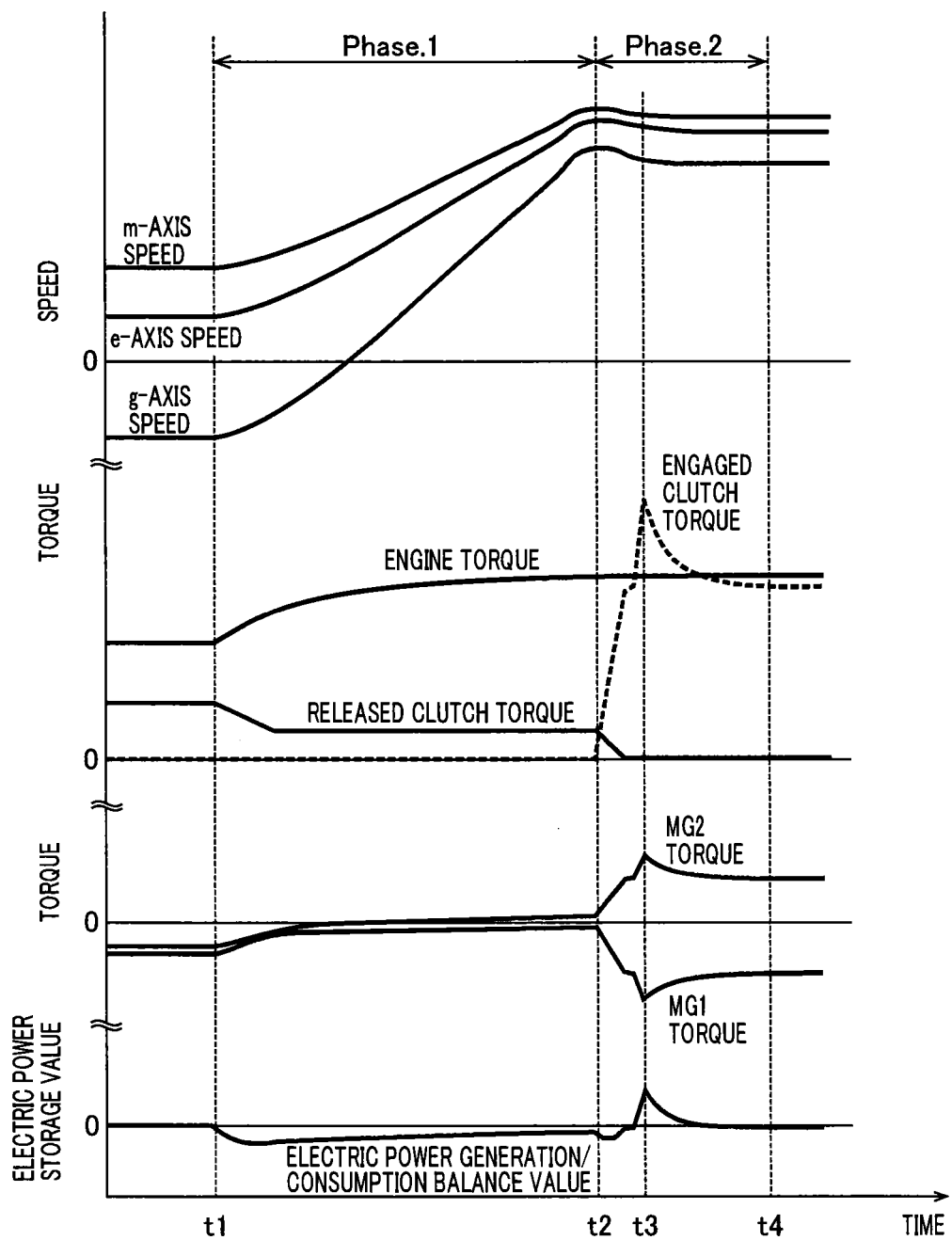
FIG. 6 is a time chart illustrating an example of the concurrent controls of the movement of the operating point of the engine and the shifting action of the step-variable transmitting portion.
Figure 7:
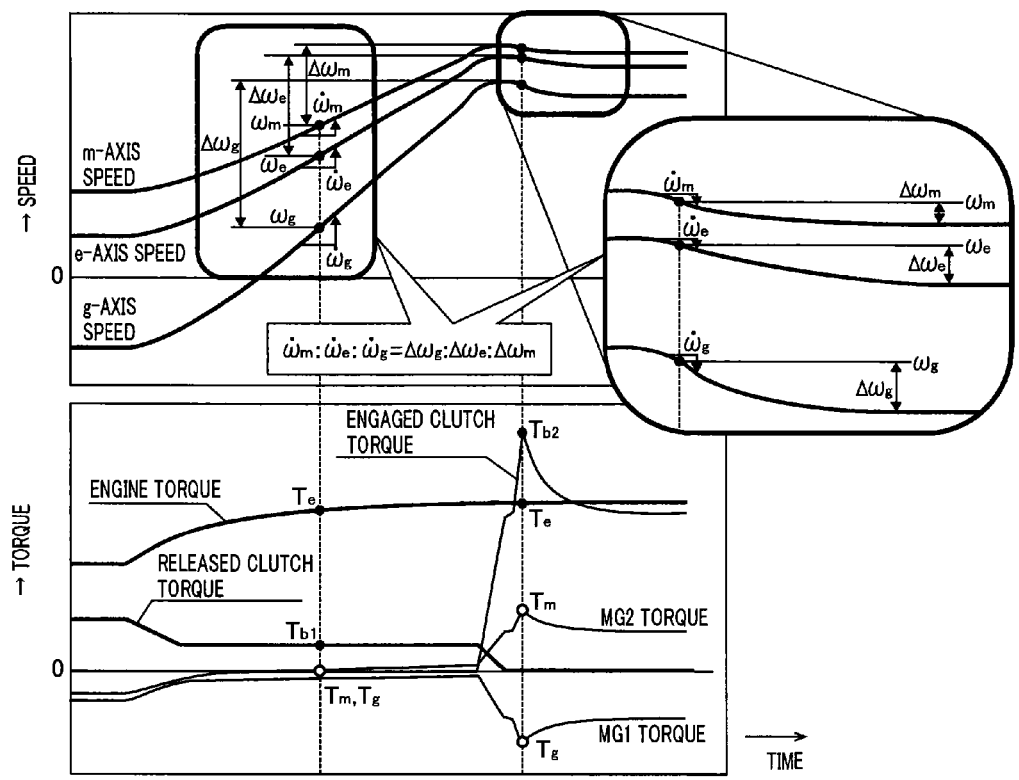
FIG. 7 is a view for explaining in detail speed controls of the first rotary element, second rotary element and third rotary element, which are implemented according to the concurrent controls illustrated in FIG. 6.

FIG. 6 is the time chart illustrating an example of the concurrent controls by the above-described shift control means 50, of the movement of the operating point of the above-described engine 12 and the shifting action of the above-described step-variable transmitting portion 20, more specifically, the shift-down action from the high-speed position H to the low-speed position L. FIG. 7 is the view for explaining in detail the speed controls of the above-described first, second and third rotary elements, which are implemented during the concurrent controls illustrated in FIG. 6. In the example of FIG. 6, it is determined at a point of time t1 that the concurrent controls of the movement of the operating point of the engine 12 and the shifting action of the step-variable transmitting portion 20 should be initiated. During a time period from the point of time t1 to a point of time t2, the above-indicated shift control means 50 implements the shifting control corresponding to a first phase (Phase 1), such that the engine torque $T_e$ is gradually increased, while the MG1 torque $T_g$ and the MG2 torque $T_m$ are increased to respective predetermined values (to values almost equal to zero, in the example of FIG. 6). Further, a clutch torque (engaging torque) $T_{b1}$ of the coupling element to be released, that is, of the first brake B1 is reduced to a predetermined value. While the engine 12, MG1, MG2 and first brake B1 are thus, controlled, the speeds of rotation about an m axis corresponding to the first rotary element in the form of the sun gear S0 (MG1), an e axis corresponding to the second rotary element in the form of the carrier C0 (engine 12), and a g axis corresponding to the third rotary element in the form of the ring gear R0 (MG2) are gradually increased.

At the point of time t2, the clutch torque (engaging torque) $T_{b2}$ of the coupling element to be engaged, that is, of the second brake B2 begins to increase. Namely, an engaging action of the second brake B2 is initiated. At this point of time t2, the speeds of rotation about the above-indicated maxis, e-axis and g-axis have been more or less excessively raised, that is, have been raised beyond (have overshot) the synchronous speed values after the shifting action (beyond the target values). Accordingly, the speeds of rotation are controlled to be lowered after the point of time t2. That is, the change rates dω/dt of the speeds of rotation about the above-indicated maxis, e-axis and g-axis are almost zero at the point of time t2, which is considered to be a point of inflection at which the change of each of the speeds is switched from an increase to a decrease. During a time period after the point of time t2, the above-described shift control means 50 implements the shifting control corresponding to the second phase (Phase 2), such that the clutch torque $T_{b1}$ of the above-indicated first brake B1 is gradually reduced to zero, while the clutch torque $T_{b2}$ of the second brake B2 is increased to a predetermined value. Further, the MG1 torque $T_g$ is reduced to a predetermined value while the MG2 torque $T_m$ is increased to a predetermined value. With the MG1, MG2, first brake B1 and second brake B2 being thus controlled, the speeds of rotation about the above-indicated maxis, e-axis and g-axis are controlled to the respective target values (that should be established after the shifting action). During a time period from this point of time t3 to a point of time t4, the clutch torque $T_{b2}$ of the above-indicated second brake B2 is reduced to a predetermined target value that should be established after the shifting action. Further, the above-indicated MG1 torque $T_g$ and MG2 torque $T_m$ are respectively increased and reduced to respective predetermined target values that should be established after the shifting action. Thus, the shifting control is terminated. Namely, the control of the shifting action by the above-described shift control means 50 indicated in FIG. 6 consists of the shifting control corresponding to the first phase during the time period from the point of time t1 to the point of time t2, and the subsequent shifting control corresponding to the second phase during the time period from the point of time t2 to the point of time t4. In the control of the shifting action indicated in FIG. 6, the target electric power generation/consumption balance value is set to be zero, but the actual balance value more or less deviates from the target value, namely, fluctuates around the target value of zero.

Where the above-described step-variable transmitting portion 20 is shifted from the high-speed position H to the low-speed position L as indicated in FIGS. 6 and 7, the above-described first brake B1 is brought into its released state while the above-described second brake B2 is brought into its engaged state. Where the step-variable transmission 20 is shifted from the low-speed position L to the high-speed position H, on the other hand, the above-described second brake B2 is brought into its released state while the above-described first brake B1 is brought into its engaged state. That is, both of the shifting actions of the step-variable transmitting portion 20 from the high-speed position H to the low-speed position L and from the low-speed position L to the high-speed position H are so-called "clutch-to-clutch shifting actions" to be performed by concurrent releasing and engaging actions of the two coupling elements. In these clutch-to-clutch shifting actions, the concurrent releasing and engaging actions may take place at a timing shortly after the rotating speeds of the relevant rotary elements have reached the synchronous speed values (target values) to reduce shifting shock. In the example of FIG. 6, too, the concurrent releasing and engaging actions take place around this timing. After this timing, the rotating speeds of the rotary elements must be controlled to coincide with the synchronous speed values to be established after the shifting action, more specifically, must be accurately controlled on the basis of comparatively small speed differences between the values at the point of time t2 and the values at the point of time t3 in FIG. 6. Accordingly, where the actual rotating speed of each of the rotary elements still continues to change after a point of time at which the actual rotating speed has reached the synchronous speed value, the point of time at which the change rate dω/dt of the actual rotating speed of the rotary element has been lowered below a given threshold value is detected as the trigger point which divides the shifting control time period into the two phases for which the respective two shifting controls are implemented according to the respective different control algorithms. There will be described the shifting control in the first phase (Phase 1).

In the shifting control in the first phase by the above-described shift control means 50, the above-indicated speed gradient ratio calculating means 52 calculates ratios of gradients or change rates of the rotating speeds of the three rotary elements of the differential mechanism in the form of the above-described power distributing device 16, that is, the rotating speed of the first rotary element in the form of the sun gear S0 (MG1), the rotating speed of the second rotary element in the form of the carrier C0 (engine 12), and the rotating speed of the third rotary element in the form of the ring gear R0 (MG2). Described more specifically, when the concurrent controls of the movement of the operating point of the above-described engine 12 and the shifting action of the above-described step-variable transmitting portion 20 are implemented, the speed gradient ratio calculating means 52 calculates: a difference $\Delta\omega_g$ ($=\omega_{gaim}-\omega_g$) between the target rotating speed of the above-indicated first rotary element, that is, the target operating speed $\omega_{gaim}$ of the MG1, to be established after the shifting action, and the present rotating or operating speed $\omega_g$; a difference $\Delta\omega_e$ ($=\omega_{eaim}-\omega_e$) between the target rotating speed of the above-indicated second rotary element, that is, the target operating speed $\omega_{eaim}$ of the engine 12, to be established after the shifting action, and the present rotating or operating speed We and a difference $\Delta\omega_m$ ($=\omega_{maim}-\omega_m$) between the target rotating speed of the above-indicated third rotary element, that is, the target operating speed $\omega_{maim}$ of the MG2, to be established after the shifting action, and the present rotating or operating speed $\omega_m$. Then, the speed gradient ratio calculating means 52 calculates ratios of the calculated differences $\Delta\omega_g$, $\Delta\omega_e$ and $\Delta\omega_m$ with respect to their sum, namely, calculates $\Delta\omega_g:\Delta\omega_e:\Delta\omega_m$. Further, the speed gradient ratio calculating means 52 calculates the change rate $d\omega_g/dt$ of the rotating speed of the above-indicated first rotary element, the change rate $d\omega_e/dt$ of the rotating speed of the above-indicated second rotary element, and the change rate $d\omega_m/dt$ of the rotating speed of the above-indicated third rotary element, and ratios of the calculated change rates $d\omega_g/dt$, $d\omega_e/dt$ and $d\omega_m/dt$ with respect to their sum, namely, $d\omega_g/dt:d\omega_e/dt:d\omega_m/dt$.

The above-indicated engine torque value obtaining means 54 obtains the present output torque value of the above-described engine 12, that is, the engine torque value $T_e$. For example, the engine torque value obtaining means 54 calculates the above-indicated engine torque value T. on the basis of the actually detected engine speed N. and an opening angle $\theta_{TH}$ of an electronic throttle valve not shown, and according to a predetermined relationship. The engine torque value obtaining means 54 may be configured to detect the actual output torque of the engine 12 on the basis of an output signal of an engine torque sensor.

The above-indicated clutch torque value obtaining means 56 obtains the present clutch torque of the coupling element to be engaged, that is, of the above-described first brake B1 or second brake B2, that is, the clutch torque $T_b$. For example, the clutch torque value obtaining means 56 calculates the above-indicated clutch torque $T_b$ on the basis of the presently commanded hydraulic pressure value of the above-indicated first brake B1 or second brake B2 (on the basis of the commanded output pressure of the relevant solenoid-operated control valve in the hydraulic control circuit not shown), and according to a predetermined relationship (predetermined engaging torque characteristic). The clutch torque value obtaining means 56 may be configured to detect the actual hydraulic pressure of the working fluid to be supplied to the above-indicated first brake B1 or second brake B2, on the basis of an output signal of a hydraulic pressure sensor provided in the hydraulic control circuit.

The above-indicated target electric power generation/consumption balance value obtaining means 58 obtains a target electric power generation/consumption balance value $\Delta P_{aim}$ relating to the MG1 and MG2. For example, the target electric power generation/consumption balance value obtaining means 58 calculates the target electric power generation/consumption balance value $\Delta P_{aim}$, on the basis of the vehicle running state, or an electric energy amount (SOC) stored in the above-described electric-energy storage device 32 provided in the above-described power transmitting system 10, and according to a predetermined relationship. This target electric power generation/consumption balance value $\Delta P_{aim}$ falls within a range between −30 [kw] and 30 [kw], and is preferably kept at zero (±0 [kw]), for instance. However, the target electric power generation/consumption balance value obtaining means 58 is configured to suitably determine the target electric power generation/consumption balance value $\Delta P_{aim}$, depending upon the electric discharging and charging conditions of the power transmitting system 10, for example, determines the balance value $\Delta P_{aim}$ to be about 5 [kw] when the above-indicated electric-energy storage device 32 is required to be charged, or about −5 [kw] when the electric-energy storage device 32 is required to be discharged.

The above-indicated target speed gradient value calculating means 60 calculates target values of the speed change rates $d\omega/dt$ of the above-described first, second and third rotary elements. Namely, the target speed gradient value calculating means 60 calculates the target values to which the speed change rate $d\omega_g/dt$ of the above-described sun gear S0 (MG1), the speed change rate $d\omega_e/dt$ of the above-described carrier C0 (engine 12), and the speed change rate $d\omega_m/dt$ of the above-described ring gear R0 (MG2) are controlled.

Where the concurrent controls of the movement of the operating point of the above-described engine 12 and the shifting action of the above-described step-variable transmitting portion 20 are implemented, the above-indicated target speed gradient value calculating means 60 calculates the target values of the gradient values or change rates of the rotating speeds of the above-indicated first, second and third rotary elements such that the ratios of these speed change rates are equal to the ratios of the differences between the present speeds and the target values (amounts of change of the speeds), or equal to values calculated according to the differences. Namely, the target speed gradient value calculating means 60 calculates the target values of the speed change rates $d\omega/dt$ of the above-indicated first, second and third rotary elements so that the ratios of the speed change rates $d\omega_g/dt$, $d\omega_e/dt$ and $d\omega_m/dt$ of the first, second and third rotary elements, which have been calculated by the speed gradient ratio calculating means 52, are respectively equal to the ratios of the differences $\Delta\omega_g$, $\Delta\omega_e$ and $\Delta\omega_m$ between the target speed values of the first, second and third rotary elements to be established after the shifting action and the present speed values, which ratios have been calculated by the above-described speed gradient ratio calculating means 52.

In other words, the above-indicated target speed gradient value Calculating means 60 obtains the target speed values of the above-indicated first, second and third rotary elements to be established after the shifting action, and their present speed values, to calculate the difference between the target and present speed values, and further calculates the ratios of the calculated speed difference of the above-indicated first, second and third rotary elements, to set the ratios of the calculated speed differences as the target values of the speed change rates. Namely, where the ratios of the differences between the target speed values of the above-indicated first, second and third rotary elements to be established after the shifting action, and the present speed values are represented by the following equation (1), the ratios of the speed change rates of the above-indicated first, second and third rotary elements are controlled so as to satisfy the following equation (2). That is, the target values of the speed change rates $d\omega/dt$ of the above-indicated first, second and third rotary elements are calculated so as to satisfy the following equation (3).

[Mathematical Formula 1]

$$\Delta\omega_g:\Delta\omega_e:\Delta\omega_m=1:\alpha:\beta \tag{1}$$

[Mathematical Formula 2]

$$\dot{\omega}_g:\dot{\omega}_e:\dot{\omega}_m=1:\alpha:\beta \tag{2}$$

[Mathematical Formula 3]

$$\Delta\omega_g:\Delta\omega_e:\Delta\omega_m=\dot{\omega}_g:\dot{\omega}_e:\dot{\omega}_m \tag{3}$$

The above-described target speed gradient value calculating means 60 is preferably configured to calculate the target values of the speed change rates $d\omega/dt$ according to the above-indicated equations (1)-(3), by effecting balance calculation on the basis of an engine output power during the shifting action, a clutch-transmitted power, a target electric power generation/consumption balance value, and an inertia working efficiency. Described specifically, the target speed gradient value calculating means 60 calculates the target values of the speed change rates $d\omega/dt$ of the above-indicated first, second and third rotary elements, by effecting the balance calculation according to predetermined relationships, and on the basis of the ratios of the speed change rates $d\omega_g/dt$, $d\omega_e/dt$ and $d\omega_m/dt$ of the above-indicated first, second and third rotary elements corresponding (namely, equal) to the respective ratios of the above-indicated speed differences $\Delta\omega_g:\Delta\omega_e:\Delta\omega_m$, the output power of the above-described engine 12 during the shifting action, the power transmitted through the coupling element in the form of the first brake B1 or second brake B2 in the process of the shifting action of the above-described step-variable transmitting portion 20, the target electric power generation/consumption balance value $\Delta P_{aim}$ of the above-described MG1 and MG2, and the inertia working efficiency.

For instance, the above-described target speed gradient value calculating means 60 calculates the target value of each of the speed change rates $d\omega/dt$ of the above-indicated first, second and third rotary elements, which target value satisfies the following equation (4) as well as the above-indicated equation (3). In the equation (4), the first member "$T_e \cdot \omega_e$" corresponds to the output power of the engine 12, the second member "$T_b \cdot \omega_m$" corresponds to the power consumed by the drive system, while "$I_g \cdot d\omega_g/dt \cdot \omega_g \cdot I_e \cdot d\omega_e/dt \cdot \omega_e \cdot I_m \cdot d\omega_m/dt \cdot \omega_m$" represented by the third, fourth and fifth members corresponds to the power used to increase the inertia. Further, the clutch torque $T_b$ is preferably the clutch torque of the coupling element of the above-described step-variable transmitting portion 20, which should be engaged to perform the shifting action, that is, the clutch torque $T_{b2}$ of the above-indicated second brake B2 which is engaged to shift down the step-variable transmitting portion 20 from the high-speed position H to the low-speed position L. In this respect, it is noted that in the balance calculation according to the equation (4), only the generation/consumption balance value (a difference from zero) is considered as the above-indicated electric power of the MG1 and MG2. Namely, the above-described target speed gradient value calculating means 60 is preferably configured to calculate the target values of the speed change rates $d\omega/dt$ of the above-indicated first, second and third rotary elements, by calculating an electric power generation/consumption balance value while excluding the work done by operations of the MG1 and MG2.

[Mathematical Formula 4]

$$T_e \cdot \omega_e - T_b \cdot \omega_m - I_g \cdot \dot{\omega}_g \cdot \omega_g - I_e \cdot \dot{\omega}_e \cdot I_m \cdot \dot{\omega}_m \cdot \omega_m = \Delta P_{aim} \quad (4)$$

The above-indicated required MG-torque value calculating means 62 is configured to calculate torque values of the above-described MG1 and MG2, which are required to realize the target values of the speed change rates $d\omega/dt$ of the above-indicated first, second and third rotary elements, which have been calculated by the above-described target speed gradient value calculating means 60. For instance, the required MG-torque value calculating means 62 obtains the MG1 torque value $T_g$ and MG2 torque value $T_m$, which satisfy the following equations (5) of motion including as their members: the target values of the speed change rate $d\omega_g/dt$ of the first rotary element (MG1), speed change rate $d\omega_g/dt$ of the second rotary element (engine 12) and speed change rate $d\omega_m/dt$ of the third rotary element (MG2), which target values have been calculated by the above-described target speed gradient value calculating means 60; the engine torque value $T_e$ obtained by the above-described engine torque value obtaining means 54; and the clutch torque value $T_b$ obtained by the above-described clutch torque value obtaining means 56. Further, the above-described shift control means 50 controls the operations of the above-described MG1 and MG2, so as to realize the thus calculated MG1 torque value $T_g$ and MG2 torque value $T_m$.

[Mathematical Formulas 5]

$$\begin{cases} \dot{\omega}_e(t) = keg \cdot T_g(t) + kee \cdot T_e(t) + kem \cdot T_m(t) + keb \cdot T_b \\ \dot{\omega}_g(t) = kgg \cdot T_g(t) + kge \cdot T_e(t) + kgm \cdot T_m(t) + kgb \cdot T_b \\ \dot{\omega}_m(t) = kmg \cdot T_g(t) + kme \cdot T_e(t) + kmm \cdot T_m(t) + kmb \cdot T_b \end{cases} \quad (5)$$

In the shifting control corresponding to the first phase (Phase 1) which is implemented as described above by the above-described shift control means 50, (a) the above-described speed gradient ratio calculating means 52 calculates the ratio of the differences $\Delta\omega_g:\Delta\omega_e:\Delta\omega_m$ between the target speed and the present speed of each of the rotary elements, and calculates the ratio of the speed change rates $d\omega_g/dt$ $d\omega_e/dt$ $d\omega_m/dt$ of each rotary element, (b) the above-described engine torque value obtaining means 54 obtains the present output torque of the above-described engine 12, that is, the engine torque value $T_e$, (c) the above-described clutch torque value obtaining means 56 obtains the present engaging torque of the coupling element in the form of the above-described first brake B1 or second brake B2 to be engaged for the shifting action of the above-described step-variable transmitting portion 20, that is, the clutch torque $T_b$, (d) the above-described target electric power generation/consumption balance value obtaining means 58 obtains the target electric power generation/consumption value $\Delta P_{aim}$ of the above-described MG1 and MG2, (e) the above-described target speed gradient value calculating means 60 calculates the target value of the speed change rate $d\omega/dt$ of each rotary element, on the basis of the various values obtained as described above in the preceding items (a)-(d), (f) the above-described required MG-torque value calculating means 62 calculates the MG1 torque value $T_g$ and MG2 torque value T. which are required to realize the target values of the speed change rates $d\omega_g/dt$, $d\omega_e/dt$ and $d\omega_m/dt$ of the rotary elements calculated as described above in the preceding item (e), and (g) the above-described shift control means 50 commands the above-described MG1 and MG2 to be operated so as to realize the MG1 torque value $T_g$ and MG2 torque value $T_m$ calculated as described above in the preceding item (f). Namely, the rotary motions of the above-indicated first, second and third rotary elements are controlled according to the control algorithms which correspond to the series of processing operations (a)-(g).

The shifting control in the second phase (Phase 2) indicated in FIG. 6 will be described next. In this shifting control in the second phase, the processing operations (b)-(e) of the series of processing operations (a)-(g) are replaced by the following processing operations (b')-(e'). Described in detail, (a) the above-described speed gradient ratio calculating means 52 calculates the ratio of the difference $\Delta\omega_g$, $\Delta\omega_e$, $\Delta\omega_m$ between the target speed and the present speed of each of the rotary elements, and calculates the ratio of the speed change rates $d\omega_g/dt:d\omega_e/dt:d\omega_m/dt$ of each rotary element, (b') the above-described target speed gradient value calculating means 60 calculates the target values of the speed change rates $d\omega/dt$ of the rotary elements, which target values permit the ratios of the speed differences $\Delta\omega_g$, $\Delta\omega_e$ and $\Delta\omega_m$ to be respectively equal to the ratios of the speed change rates $d\omega_g/dt$, $d\omega_e/dt$ and $d\omega_m/dt$, and which permit the rotating speeds of the rotary elements to smoothly change to the synchronous speed values to be established after the shifting action, within a predetermined length of time after the point of time at which the phase is switched. (c') the above-described engine torque value obtaining means 54 obtains the present output torque of the above-described engine 12, that is, the engine torque value $T_e$, (d') the above-described target electric power generation/consumption balance value obtaining means 58 obtains the target electric power generation/consumption value $\Delta P_{aim}$ of the above-described MG1 and MG2, (e') the commanded clutch torque value calculating means 64 which will be described in detail calculates a commanded value of the clutch torque $T_b$, on the basis of the target values of the speed change rates $d\omega_g/dt$ $d\omega_e/dt$ $d\omega_m/dt$ of the rotary elements, the engine torque value $T_e$ and the target electric power generation/consumption balance value $\Delta P_{aim}$, which have been obtained as described above in the preceding items (b')-(d'), (f) the above-described required MG-torque value calculating means 62 calculates the MG1 torque value $T_g$ and MG2 torque value T. which are required to realize the target values of the speed change rates $d\omega_g/dt$, $d\omega_e/dt$ and $d\omega_m/dt$ of the rotary elements calculated as described above in the preceding item (b'), and (g) the above-described shift control means 50 commands the above-described MG1 and MG2 to be operated so as to realize the MG1 torque value $T_g$ and MG2 torque value $T_m$ calculated as described above in the preceding item (f), and commands the hydraulic control circuit (not shown) to be operated according to the commanded value of the clutch torque $T_b$ calculated as described above in the preceding item (e'). Namely, the rotary motions of the above-indicated first, second and third rotary elements are controlled according to the control algorithms which correspond to the series of processing operations (a), (b')-(e'), (f) and (g).

The above-indicated commanded clutch torque value calculating means 64 is configured to calculate the commanded value of the engaging torque of the coupling element in the form of the above-described first brake B1 or second brake B2 which should be engaged for the shifting action of the above-described step-variable transmitting portion 20. Described more specifically, the commanded clutch torque value calculating means 64 calculates the clutch torque $T_b$ which satisfies the above-indicated equation (4) including: the target values of the speed change rate $d\omega_g/dt$ of the first rotary element (MG1), speed change rate $d\omega_e/dt$ of the second rotary element (engine 12) and speed change rate $d\omega_m/dt$ of the third rotary element (MG2), which target values have been calculated by the above-described target speed gradient value calculating means 60; the engine torque value $T_e$ obtained by the above-described engine torque value obtaining means 54; and the target electric power generation/consumption balance value $\Delta P_{aim}$ obtained by the above-described target electric power generation/consumption balance value obtaining means 58. The clutch torque $T_b$ is preferably the clutch torque of the coupling element of the above-described step-variable transmitting portion 20, which should be engaged to perform the shifting action, that is, the clutch torque $T_{b2}$ of the above-indicated second brake B2 which is engaged to shift down the step-variable transmitting portion 20 from the high-speed position H to the low-speed position L.

It will be understood from the foregoing description that the above-described shift control means 50 is preferably configured to achieve the target values of the speed change rates $d\omega/dt$ of the above-indicated first, second and third rotary elements, by controlling at least one of: the above-described engine torque $T_e$; the torque of the coupling element provided in the above-described step-variable transmitting portion 20; the above-described MG1 torque; and the above-described MG2 torque. Further, the shift control means 50 is preferably configured to achieve the target values of the speed change rates $d\omega/dt$, while taking account of the work done by the operations of the above-described MG1 and MG2. That is, the shift control means 50 does not exclude the work done by operations of the MG1 and MG2, but determines a control amount for each of the controllable devices while taking account of operations of all relevant devices, which include the work done by the MG1 and MG2.

Further, the shift control means 50 is preferably configured to implement the concurrent controls of the movement of the operating point of the above-described engine 12 and the shifting action of the above-described step-variable transmitting portion 20, such that in the event of a change of the target rotating speed $\omega_{gaim}$, $\omega_{gaim}$, $\omega_{maim}$ of at least one of the above-indicated first, second and third rotary elements to be established after the shifting action of the above-described step-variable transmitting portion 20, the speed change rate $d\omega/dt$ of each of the above-indicated at least one of the rotary elements is updated depending upon the changed target rotating speed. This updating of the speed change rate $d\omega/dt$ is made preferably at a point of time at which the absolute value of the actual speed change rate $d\omega/dt$ of the relevant rotary element has been lowered below the predetermined threshold value (e.g., a small value which is substantially zero), more preferably at a point of time at which the absolute values of the actual speed change rates $d\omega/dt$ of all of the rotary element have been lowered below the respective threshold values. Further, the above-indicated updating of the speed change rate is preferably made after the actual speed change rate $d\omega/dt$ of the relevant one of the first, second and third rotary elements has been reduced below the speed change rate prior to the change of the target rotating speed.

Figure 8:
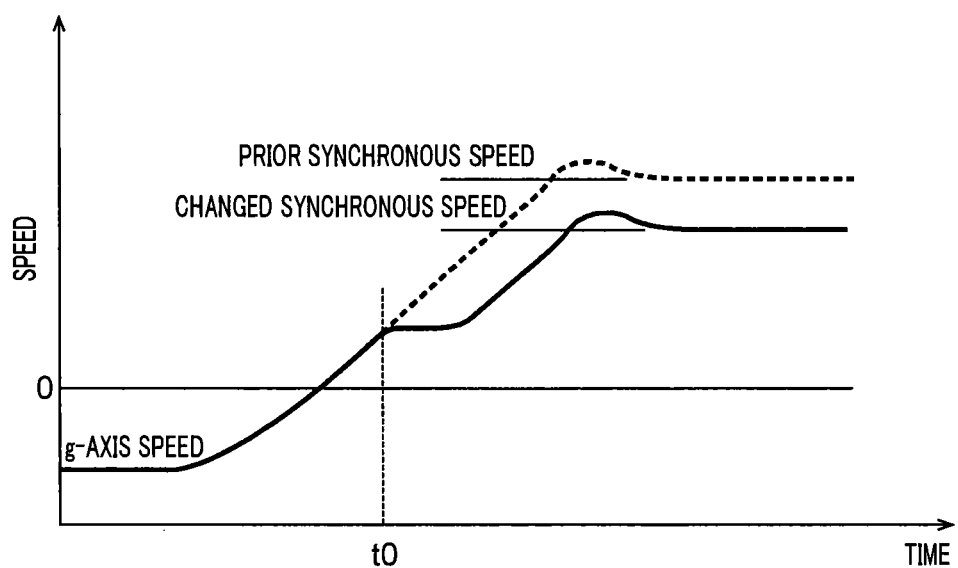
FIG. 8 is a view for explaining a control to be implemented in the event of a change of a target value of the rotating speed of the third rotary element during the concurrent controls of the movement of the operating point of the engine and the shifting action of the step-variable transmitting portion.

FIG. 8 is the view for explaining a control to be implemented in the event of a change of the target rotating speed (synchronous speed) of the g-axis corresponding to the third rotary element in the form of the ring gear R0 (MG2) during the concurrent controls of the movement of the operating point of the above-described engine 12 and the shifting action of the above-described step-variable transmitting portion 20. In the actual control, the target rotating speeds of the first and second rotary elements as well as that of the third rotary element may be changed. In the control of FIG. 8, only the change of the target rotating speed of the third rotary element is indicated in the figure by way of example. In the control of FIG. 8, the target rotating speed (synchronous speed) of the third rotary element after the shifting action is changed at a point of time to. In FIG. 8, the speed change rate corresponding to the changed target rotating speed of the g-axis to be established after the shifting action is indicated by solid line, while the speed change rate corresponding to the prior target rotating speed of the g-axis to be established after the shifting action is indicated by broken line. In the event of a change of the target rotating speed to be established after the shifting action, which is caused by an operation of the accelerator pedal in the process of the shifting action, for instance, the above-described shift control means 50 lowers the speed change rate $d\omega/dt$ of the relevant rotary element as compared with that before the change of the target rotating speed, preferably, zeroes the speed change rate $d\omega/dt$, as indicated in FIG. 8. After the absolute value of the speed change rate $d\omega/dt$ of the relevant rotary element has been lowered below the threshold value, the present manner of control of the shifting action is reset, by updating the target value of the speed gradient, that is, the speed change rate dω/dt corresponding to the changed target rotating speed to be established after the shifting action. In the event of a change of the target rotating speed of the relevant rotary element during the concurrent controls of the movement of the operating point of the above-described engine 12 and the shifting action of the above-described step-variable transmitting portion 20, there is a possibility of deviation of the electric power generation/consumption balance value of the above-described MG1 and MG2 from the target value, for example. In view of this possibility, the present manner of control of the shifting action is reset according to the change of the target rotating speed, by updating the speed change rate of the relevant rotary element, in order to permit an adequate control of the shifting action while reducing deterioration of the fuel economy.

FIG. 9 is the flow chart illustrating a major portion of the shifting control which is implemented by the above-described E-ECU 22, MG-ECU 34 and T-ECU 44, with a predetermined cycle time.

Initially, step S1 ("step" being hereinafter omitted) is implemented to determine that the shifting control of Phase 1 should be initiated. Then, the control flow goes to S2 to calculate a ratio of the differences $\Delta\omega_g:\Delta\omega_e:\Delta\omega_m$ i.e. a ratio among differences between the target and present values of the rotating speeds of each of the above-indicated first, second and third rotary elements, and to calculate a ratios of the speed change rates $d\omega_g/dt:d\omega_e/dt:d\omega_m/dt$ of the rotary elements. Then, the control flow goes to S2a to determine whether there has arisen a change of the target rotating speed of each rotary element to be established after the shifting action. If a negative determination is obtained in this S2a, the control flow goes to S3 and the following steps. If an affirmative determination is obtained in the S2a, the control flow goes to S2b to determine whether the target value of the speed gradient, that is, speed change rate dω/dt of each rotary element has been zeroed. If a negative determination is obtained in this S2b, the control flow goes to S2c to zero the target value of the speed change rate dω/dt, and goes to S3 and the following steps. If an affirmative determination is obtained in the S2b, the control flow goes to Std to calculate again the ratio of the differences $\Delta\omega_g:\Delta\omega_e:\Delta\omega_m$ i.e., differences between the target and present values of the rotating speeds of each rotary element, and the ratios of the speed change rates $d\omega_g/dt:d\omega_e/dt:d\omega_m/dt$ of the rotary elements.

S3 is implemented to determine whether the shifting control of Phase 2 should be initiated. If an affirmative determination is obtained in this S3, the control flow goes to S 13 and the following steps. If a negative determination is obtained in the S3, the control flow goes to S4 to determine whether an overshoot of the rotating speed ω of each rotary element has taken place, namely, whether the rotating speed ω of each rotary element is equal to or higher than the synchronous speed $\omega_{aim}$ to be established after the shifting action. If a negative determination is obtained in this S4, the control flow goes to S6 and the following steps. If an affirmative determination is obtained in the S4, the control flow goes to S5.

S5 is implemented to determine whether the speed gradient, that is, the speed change rate dω/dt of each rotary element is held within a predetermined range, namely, whether the absolute value of he speed change rate dω/dt is smaller than a predetermined threshold value. If an affirmative determination is obtained in this S5, the control flow goes to S12 and the following steps. If a negative determination is obtained in the S5, the control flow goes to S6 to obtain the output torque of the above-described engine 12, that is, the engine torque value $T_e$. Then, the control flow goes to S7 to obtain the engaging torque, that is, the clutch torque value $T_b$ of the above-described brake B1 or second brake B2. Then, the control flow goes to S8 to obtain the target electric power generation/consumption balance value $\Delta P_{aim}$ of the above-described MG1 and MG2. The control flow then goes to S9 to calculate the target value of the speed change rate dω/dt of each rotary element, on the basis of the various values obtained in the S2 and S6-S8. Then, the control flow goes to S10 to calculate the MG1 torque $T_g$ and MG2 torque $T_m$ required to establish the target value of the speed change rate dω/dt of each rotary element calculated in the S9, and to command the above-described MG1 and MG2 to operate so as to generate the calculated MG1 torque $T_g$ and MG2 torque $T_m$. The control flow then goes to S11 to determine whether the shifting action is termination. If a negative determination is obtained in this S11, the control flow goes back to the S2 and the following steps. If an affirmative determination is obtained in the S 11, one cycle of execution of the present control routine is terminated.

S12 is implemented to switch the shifting control from Phase 1 to Phase 2. Then, the control flow goes to S13 to calculate the target values of the speed change rate do/dt of the rotary elements, which target values permit the ratios of the speed differences $\Delta\omega_g$, $\Delta\omega_e$ and $\Delta\omega_m$ to be respectively equal to the ratios of the speed change rates $d\omega_g/dt$, $d\omega_e/dt$ and $d\omega_m/dt$, and which permit the rotating speeds of the rotary elements to smoothly change to the synchronous speed values to be established after the shifting action, within a predetermined length of time after the point of time at which the phase is switched. The control flow then goes to S14 to obtain the output torque of the above-described engine 12, that is, the engine torque $T_e$, and then to S15 to obtain the target electric power generation/consumption balance value $\Delta P_{aim}$ of the above-described MG1 and MG2. Then, the control flow goes to S16 to calculate the commanded value of the clutch torque $T_b$, on the basis of the target value of the speed change rate dω/dt, of each rotary element, engine torque Te and electric power generation/consumption balance value $\Delta P_{aim}$ obtained in the S 13-S 15.

In the control described above, S1-S11 correspond to the operation of the above-described shift control means 50, and S2 and S2a-S2d correspond to the operation of the above-described speed gradient ratio calculating means 52, while S6 and S14 correspond to the operation of the above-described engine torque value obtaining means 54. Further, S7 corresponds to the operation of the above-described clutch torque value obtaining means 56, and S8 and S 15 correspond to the operation of the above-described target electric power generation/consumption balance value obtaining means 58, while S9 and S13 correspond to the operation of the above-described target speed gradient value calculating means 60. Further, S 10 corresponds to the operation of the above-described required MG-torque value calculating means 62, and S 16 corresponds to the operation of the above-described commanded clutch torque value calculating means 64.

The control apparatus according to the present embodiment is configured to implement the concurrent controls of the movement of the operating point of the above-described engine 12 and the shifting action of the above-described step-variable transmitting portion 20, such that the ratios of the speed change rates dω/dt of the rotating speeds of the first rotary element in the form of the sun gear S0, second rotary element in the form of the carrier C0 and third rotary element in the form of the ring gear R0 are respectively equal to the ratios of the differences Δω between the present actual rotating speeds of the first, second and third rotary elements and target values of the rotating speeds of the first, second and third rotary elements to be established after the shifting action, so that the shifting shock of the step-variable transmitting portion can be reduced while controlling the electric power generation/consumption balance to the desired value. Namely, the control apparatus for the hybrid vehicle 8 permits an adequate control of the shifting action while reducing deterioration of the fuel economy of the hybrid vehicle 8.

Further, the concurrent controls of the movement of the operating point of the above-described engine 12 and the shifting action of the above-described step-variable transmitting portion 20 are implemented such that in the event of a change of the target value of the rotating speed of at least one of the above-described first, second and third rotary elements to be established after the shifting action, the change rate $d\omega/dt$ of the rotating speed of each of the above-described at least one of the first, second and third rotary elements is updated depending upon the changed target value. In this case, the shifting action can be adequately controlled without deviation of the electric power generation/consumption balance value even in the event of a change of the target rotating speed value due to an operation of the accelerator pedal in the process of the shifting action.

Further, the change rate of the rotating speed $d\omega/dt$ of each of the above-indicated at least one of the first, second and third rotary elements is updated at a point of time at which the absolute value of the actual change rate $d\omega/dt$ of the relevant rotary element has been lowered below the predetermined threshold value. Accordingly, an abrupt change of the rotating speed of each rotary element can be prevented, so that the shifting action can be more adequately controlled.

Further, the target value of the change rate $d\omega/dt$ of the rotating speed of each of the above-indicated first, second and third rotary elements is calculated by effecting balance calculation according to the predetermined relationship, and on the basis of the ratios of the change rates $d\omega/dt$ of the rotating speeds of the above-indicated first, second and third rotary elements corresponding to the respective ratios of the above-indicated differences $\Delta\omega$, the output power of the above-described engine 12 during the shifting action, the power transmitted through the coupling element in the form of the first brake B1 or second brake B2 provided in the above-described step-variable transmitting portion 20, the target value $\Delta P_{aim}$ of the electric power generation/consumption balance value of the first electric motor in the form of the above-described MG1 and the second electric motor in the form of the above-described MG2, and the inertia working efficiency. In this case, the target value of the change rate $d\omega/dt$ of the rotating speed of each rotary element, which permits the shifting action to be adequately controlled without deviation of the electric power generation/consumption balance value from its target value, can be obtained in a practically advantageous manner.

Further, the target value of the change rate $d\omega/dt$ of the rotating speed of each of the above-described first, second and third rotary elements is achieved by controlling at least one of the torque of the above-described engine 12, the torque of the above-described first brake B1 or second brake B2 provided in the above-described step-variable transmitting portion 20, the torque of the above-described MG1 and the torque of the above-described MG2. Accordingly, the shifting action can be controlled in a practically advantageous manner, so as to reduce the shifting shock while controlling the electric power generation/consumption balance to the desired value.

Further, the balance calculation is effected by calculating the electric power generation/consumption balance value while excluding a work done by operations of the above-described MG1 and MG2. Accordingly, the balance calculation of input and output powers can be effected in a practically advantageous manner in the power transmitting system 10 provided with the above-described electrically operated continuously-variable transmitting portion 19 and step-variable transmitting portion 20.

Further, the target value of the above-indicated change rate $d\omega/dt$ of the rotating speed is achieved while taking account of the work done by operations of the above-described MG1 and MG2. In this case, the shifting action can be controlled in a practically advantageous manner, so as to reduce the shifting shock while controlling the electric power generation/consumption balance to the desired value.

While the preferred embodiment of this invention has been described in detail by reference to the drawings, it is to be understood that the invention is not limited to the details of the illustrated embodiment, and may be otherwise embodied.

In the illustrated embodiment, the principle of the present invention is applied to the control of a power transmitting mechanism wherein the above-described electrically operated continuously-variable transmitting portion 19 and step-variable transmitting portion 20 are connected in series with each other by the output shaft 14. However, the application of the invention is not limited to this type of power transmitting mechanism. For instance, the invention is equally applicable to a power transmitting mechanism wherein a single coupling element or a plurality of coupling elements (clutch or clutches) is/are disposed between the above-described electrically operated continuously-variable transmitting portion 19 and step-variable transmitting portion 20. Namely, a step-variable transmitting portion provided in a hybrid vehicle to which the present invention is applicable is not limited to the one provided in the illustrated embodiment, but is equally applicable to a hybrid vehicle with a multi-step transmitting portion having three or more speed positions, for example. The present invention is also applicable to a hybrid vehicle provided with a continuously-variable transmission such as a CVT operable to perform shifting actions in multiple steps having respective different speed ratios.

In the illustrated embodiment, the principle of the present invention is applied to the control of the so-called "clutch-to-clutch shifting actions" to be performed by concurrent releasing and engaging actions of a plurality of coupling elements. However, the principle of the invention is equally applicable to the control of a shifting action to be performed to shift a step-variable transmitting portion to the low-speed position L by releasing the coupling element in the form of the above-described first brake B1, while locking a one-way clutch which is also provided in the step-variable transmission portion and which permits rotary motions of the carrier C1 and ring gear R2 relative to the housing 42 in the direction of operation of the above-described engine 12, but inhibits the relative rotary motions in the reverse direction.

Although the illustrated embodiment is configured to calculate the target value of the speed change rates of rotary elements, by using the equations (5) of motions, this target value may be calculated by using a plurality of maps between the target speed change rate value, and the accelerator pedal operation amount, for instance, which maps are prepared by experimentation or simulation.

It is to be further understood that the present invention may be embodied with various other changes not illustrated herein, without departing from the spirit of the invention.

Nomenclature Of Reference Signs

8: Hybrid vehicle 10: Power transmitting system 12: Engine 14: Output shaft 16: Power distributing device (Differential Mechanism) 17: Differential gear device 18: Drive wheels 19: Electrically operated continuously-variable transmitting portion 20: Step-variable transmitting portion 22: Electronic control device 24: Accelerator pedal 26: Brake pedal 28, 30: Inverters 32: Electric-energy storage device 34: Electronic control device 36: Shift lever 38: Crankshaft 40: Damper 42: Housing 44: Electronic control device 46, 48: Planetary gear sets 50: Shift control means 52: Speed gradient ratio calculating means 54: Engine torque value obtaining means 56: Clutch torque value obtaining means 58: Target electric power generation/consumption balance value obtaining means 60: Target speed gradient value calculating means 62: Required MG-torque value calculating means 64: Commanded clutch torque value calculating means AS: Accelerator angle sensor BS: Brake sensor B1: First brake (Coupling element) B2: Second brake (Coupling element) C0: Carrier (Second rotary element, Input rotary member) NS: Engine speed sensor MG1: First motor/generator (First electric motor) MG2: Second motor/generator (second electric motor) RE1: MG1 resolver RE2: MG2 resolver R0: Ring gear (Third rotary element, Output rotary member) SS: Shift position sensor SW1: First hydraulic pressure switch SW2: Second hydraulic pressure switch SW3: Third hydraulic pressure switch S0: Sun gear (First rotary element) TS: Oil temperature sensor

The invention claimed is:

1. A control apparatus for a hybrid vehicle provided with a differential mechanism provided with a first rotary element, a second rotary element functioning as an input rotary element and connected to an engine, and a third rotary element functioning as an output rotary element;

a first electric motor connected to said first rotary element;

an electrically operated continuously-variable transmitting portion having a second electric motor operatively connected to a power transmitting path from said third rotary element to drive wheels; and a step-variable transmitting portion constituting a part of a power transmitting path from said electrically operated continuously-variable transmitting portion to the drive wheels, said control apparatus implementing concurrent controls of a movement of an operating point of said engine and a shifting action of said step-variable transmitting portion, such that ratios of change rates of rotating speeds of said first, second and third rotary elements are respectively equal to ratios of differences between present actual values of the rotating speeds of said first, second and third rotary elements and target values of the rotating speeds of the first, second and third rotary elements to be established after the shifting action, said control apparatus implementing the concurrent controls of the movement of the operating point of said engine and the shifting action of said step-variable transmitting portion such that in the event of a change of the target value of the rotating speed of at least one of said first, second and third rotary elements to be established after the shifting action, the change rate of the rotating speed of each of said at least one of the first, second and third rotary elements is updated depending upon the changed target value, and said control apparatus is configured to update said change rate of the rotating speed of said each of the at least one of the first, second and third rotary elements, at a point of time at which an absolute value of the actual change rate of rotating speed of said each rotary element has been lowered below a predetermined threshold value.

2. A control apparatus for a hybrid vehicle provided with a differential mechanism provided with a first rotary element, a second rotary element functioning as an input rotary element and connected to an engine, and a third rotary element functioning as an output rotary element;

a first electric motor connected to said first rotary element;

an electrically operated continuously-variable transmitting portion having a second electric motor operatively connected to a power transmitting path from said third rotary element to drive wheels; and a step-variable transmitting portion constituting a part of a power transmitting path from said electrically operated continuously-variable transmitting portion to the drive wheels, said control apparatus implementing concurrent controls of a movement of an operating point of said engine and a shifting action of said step-variable transmitting portion, such that ratios of change rates of rotating speeds of said first, second and third rotary elements are respectively equal to ratios of differences between present actual values of the rotating speeds of said first, second and third rotary elements and target values of the rotating speeds of the first, second and third rotary elements to be established after the shifting action, and said control apparatus is configured to calculate a target value of the change rate of the rotating speed of each of said first, second and third rotary elements, by effecting balance calculation according to a predetermined relationship, and on the basis of the ratios of the change rates of the rotating speeds of the above-indicated first, second and third rotary elements corresponding to the respective ratios of said differences, an output power of said engine during the shifting action, a power transmitted through a coupling element provided in said step-variable transmitting portion, a target value of an electric power generation/consumption balance value of said first electric motor and said second electric motor, and an inertia working efficiency.

3. The control apparatus according to claim 2, which is configured to achieve the target value of the change rate of the rotating speed of each of said first, second and third rotary elements, by controlling at least one of a torque of said engine, a torque of the coupling element provided in said step-variable transmitting portion, a torque of said first electric motor and a torque of said second electric motor.

4. The control apparatus according to claim 2, which is configured to effect the balance calculation, by calculating the electric power generation/consumption balance value such that the generation/consumption balance value is considered as an electric power of said first electric motor and said second electric motor.

5. The control apparatus according to claim 3, which is configured to achieve a target value of said change rate of the rotating speeds of each of said first, second and third rotary elements, while taking account of a work done by operations of said first electric motor and said second electric motor.

* * * * *